United States Patent
Schwager et al.

(10) Patent No.: US 8,693,340 B2
(45) Date of Patent: Apr. 8, 2014

(54) METHOD AND APPARATUS FOR LEAST COST ROUTING USING MULTIPLE PATH ACCUMULATED CONSTRAINTS

(75) Inventors: Steven D. Schwager, Lisle, IL (US); Jonathan B. Sadler, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 308 days.

(21) Appl. No.: 12/727,852

(22) Filed: Mar. 19, 2010

(65) Prior Publication Data

US 2011/0170416 A1 Jul. 14, 2011

Related U.S. Application Data

(60) Provisional application No. 61/294,890, filed on Jan. 14, 2010.

(51) Int. Cl.
*H04L 12/26* (2006.01)
*H04L 12/56* (2011.01)
*G06F 15/173* (2006.01)

(52) U.S. Cl.
USPC ........... 370/238; 370/252; 370/351; 370/389; 709/241

(58) Field of Classification Search
USPC ......... 370/237, 238, 252, 254, 255, 351, 389; 709/240, 241
See application file for complete search history.

(56) References Cited

U.S. PATENT DOCUMENTS

| | | | | |
|---|---|---|---|---|
| 6,762,997 B1* | 7/2004 | Liu et al. | | 370/238 |
| 7,046,634 B2* | 5/2006 | Wong et al. | | 370/238 |
| 7,187,652 B2* | 3/2007 | Lee et al. | | 370/238 |
| 7,443,832 B2* | 10/2008 | Randriamasy et al. | | 370/351 |
| 7,778,248 B2* | 8/2010 | Scudder et al. | | 370/392 |
| 7,869,359 B2* | 1/2011 | Kohler et al. | | 370/231 |
| 7,965,713 B2* | 6/2011 | Levy et al. | | 370/392 |
| 8,085,688 B2* | 12/2011 | Cooper et al. | | 370/254 |
| 8,159,954 B2* | 4/2012 | Larsson et al. | | 370/238 |
| 2002/0186665 A1* | 12/2002 | Chaffee et al. | | 370/255 |
| 2008/0181118 A1* | 7/2008 | Sharma et al. | | 370/238 |
| 2009/0190494 A1* | 7/2009 | De Giovanni et al. | | 370/254 |
| 2009/0304380 A1* | 12/2009 | Sadananda et al. | | 398/26 |

OTHER PUBLICATIONS

Dijkstra, E. W. "A note on two problems in connexion with graphs". Numerische Mathematik 3 pages, 1: 269-271 (Jun. 15, 1959).

* cited by examiner

*Primary Examiner* — Candal Elpenord
(74) *Attorney, Agent, or Firm* — Hamilton, Brook, Smith & Reynolds, P.C.

(57) ABSTRACT

A cost of a path may not be the only factor in searching for a path solution in a network. For example, some applications are delay sensitive and require finding a path that does not exceed a latency constraint for the entire path. Accordingly, a method and corresponding apparatus for searching for a path solution in a network is provided that identifies combinations of partial paths that satisfy an end-to-end path constraint, compares attributes of the combinations of partial paths, prunes the combinations of partial paths based on results of the comparing to identify candidate combinations of partial paths, and selects a candidate combination of partial paths as the path solution. By pruning combinations of partial paths, considerable is saved compared to exhaustive comparing of every possible combination of partial paths and scalability is achieved.

25 Claims, 9 Drawing Sheets

| path id | dest | candidate paths | cost | latency |
|---|---|---|---|---|
| 1 | A | | 0 | 0 |
| | | | | |

| unexpanded paths |
|---|
| 0,1 |
| |

FIG. 2A

| path id | dest | candidate paths | cost | latency |
|---|---|---|---|---|
| 1 | A | | 0 | 0 |
| 2 | D | ad | 20 | 50 |

| unexpanded paths |
|---|
| |
| |

FIG. 2B

| path id | dest | candidate paths | cost | latency |
|---|---|---|---|---|
| 1 | A | | 0 | 0 |
| 2 | D | ad | 20 | 50 |

| unexpanded paths |
|---|
| 20,2 |
| |

FIG. 2C

| path id | dest | candidate paths | cost | latency |
|---|---|---|---|---|
| 1 | A | | 0 | 0 |
| 2 | D | ad | 20 | 50 |
| 3 | B | ab | 10 | 20 |

| unexpanded paths |
|---|
| 20,2 |
| |
| |

FIG. 2D

| path id | dest | candidate paths | cost | latency |
|---|---|---|---|---|
| 1 | A | | 0 | 0 |
| 2 | D | ad | 20 | 50 |
| 3 | B | ab | 10 | 20 |

| unexpanded paths |
|---|
| 10,3 |
| 20,2 |

FIG. 2E

| path id | dest | candidate paths | cost | latency |
|---|---|---|---|---|
| 1 | A | | 0 | 0 |
| 2 | D | ad | 20 | 50 |
| 3 | B | ab | 10 | 20 |
| 4 | C | ab,bc | 15 | 25 |

| unexpanded paths |
|---|
| 10,3 |
| 20,2 |

FIG. 2F

| path id | dest | candidate paths | cost | latency |
|---|---|---|---|---|
| 1 | A | | 0 | 0 |
| 2 | D | ad | 20 | 50 |
| 3 | B | ab | 10 | 20 |
| 4 | C | ab,bc | 15 | 25 |
| 5 | D | ab,bd | 30 | 40 |

| unexpanded paths |
|---|
| 15,4 |
| 20,2 |

FIG. 2G

| path id | dest | candidate paths | cost | latency |
|---|---|---|---|---|
| 1 | A | | 0 | 0 |
| 2 | D | ad | 20 | 50 |
| 3 | B | ab | 10 | 20 |
| 4 | C | ab,bc | 15 | 25 |
| 5 | D | ab,bd | 30 | 40 |

| unexpanded paths |
|---|
| 15,4 |
| 20,2 |
| 30,5 |

FIG. 2H

| path id | dest | candidate paths | cost | latency |
|---|---|---|---|---|
| 1 | A | | 0 | 0 |
| 2 | D | ad | 20 | 50 |
| 3 | B | ab | 10 | 20 |
| 4 | C | ab,bc | 15 | 25 |
| 5 | D | ab,bd | 30 | 40 |
| 6 | D | ab,bc,cd1 | 20 | 45 | unexpanded paths: 20,2 ; 30,5

FIG. 2I

| path id | dest | candidate paths | cost | latency |
|---|---|---|---|---|
| 1 | A | | 0 | 0 |
| 3 | B | ab | 10 | 20 |
| 4 | C | ab,bc | 15 | 25 |
| 5 | D | ab,bd | 30 | 40 |
| 6 | D | ab,bc,cd1 | 20 | 45 |
| 7 | D | ab,bc,cd2 | 25 | 30 | unexpanded paths: 20,6 ; 30,5

FIG. 2J

| path id | dest | candidate paths | cost | latency |
|---|---|---|---|---|
| 1 | A | | 0 | 0 |
| 3 | B | ab | 10 | 20 |
| 4 | C | ab,bc | 15 | 25 |
| 6 | D | ab,bc,cd1 | 20 | 45 |
| 7 | D | ab,bc,cd2 | 25 | 30 | unexpanded paths: 20,6 ; 25,7

FIG. 2K

| path id | dest | candidate paths | cost | latency |
|---|---|---|---|---|
| 1 | A | | 0 | 0 |
| 3 | B | ab | 10 | 20 |
| 4 | C | ab,bc | 15 | 25 |
| 6 | D | ab,bc,cd1 | 20 | 45 |
| 7 | D | ab,bc,cd2 | 25 | 30 |
| 8 | E | ab,bc,cd1,de | 25 | 55 |

| unexpanded paths |
|---|
| 25,7 |

FIG. 2L

| path id | dest | candidate paths | cost | latency |
|---|---|---|---|---|
| 1 | A | | 0 | 0 |
| 3 | B | ab | 10 | 20 |
| 4 | C | ab,bc | 15 | 25 |
| 6 | D | ab,bc,cd1 | 20 | 45 |
| 7 | D | ab,bc,cd2 | 25 | 30 |
| 9 | E | ab,bc,cd2,de | 30 | 40 |

| unexpanded paths |
|---|
| |

FIG. 2M

| path id | dest | candidate paths | cost | latency |
|---|---|---|---|---|
| 1 | A | | 0 | 0 |
| 3 | B | ab | 10 | 20 |
| 4 | C | ab,bc | 15 | 25 |
| 6 | D | ab,bc,cd1 | 20 | 45 |
| 7 | D | ab,bc,cd2 | 25 | 30 |
| 9 | E | ab,bc,cd2,de | 30 | 40 |

| unexpanded paths |
|---|
| 30,9 |

FIG. 2N

METHOD AND APPARATUS FOR LEAST COST ROUTING USING MULTIPLE PATH ACCUMULATED CONSTRAINTS

RELATED APPLICATION

This application claims the benefit of U.S. Provisional Application No. 61/294,890, filed on Jan. 14, 2010. The entire teachings of the above application is incorporated herein by reference.

BACKGROUND OF THE INVENTION

When routing a connection through a network, there are well-known techniques for finding a least-cost-route or path. However, there are applications where the cost of a route is not the only factor. For example, some computer and network applications are delay sensitive and require finding a route that does not exceed a latency constraint for the entire route.

Another example occurs during the routing of circuits through an optical network. As an optical signal traverses an optical network, noise accumulates at each link. In practice, this noise can build up to a point at which the signal is not usable. When routing a circuit through an optical network, it may be necessary to select a route that meets signal-to-noise requirements or constraints.

Some techniques for finding a path through a network implement the Dijkstra algorithm. The Dijkstra algorithm is widely known as an algorithm to compute a least-cost-route efficiently. While these techniques will find a least-cost-route, they do not take into account constraints for end-to-end path accumulated metrics, such as latency and signal-to-noise constraints.

SUMMARY OF THE INVENTION

Example embodiments of the present invention may be implemented in the form of a method or corresponding apparatus that searches for a path solution in a network. A method, and corresponding apparatus, according to one embodiment of the present invention includes identifying combinations of partial paths that satisfy an end-to-end path constraint. The method compares attributes of the combinations of partial paths. The method then prunes the combinations of partial paths based on results of the comparing to identify candidate combinations of partial paths. The method selects a candidate combination of partial paths as the path solution.

The method may find, for example, a least cost route or path (i.e., combination of partial paths) that meets all constraints for end-to-end path accumulated metrics.

Another embodiment employs Dijkstra or other least-cost-route processing when there are no constraints.

Yet another embodiment searches efficiently by following the least cost path (i.e., combination of partial paths) when there are constraints. Because of the nature of finding a path solution, this embodiment of the technique, unlike Dijkstra, maintains knowledge of multiple combinations of partial paths to the same destination node.

Still yet another embodiment of the technique prunes combinations of partial paths that have no advantages over other combinations of partial paths rather than perform an exhaustive search of all combinations of partial paths through the network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-N are tables representing containers of an example implementation;

DETAILED DESCRIPTION OF THE INVENTION

A description of example embodiments of the invention follows.

Figure 1:
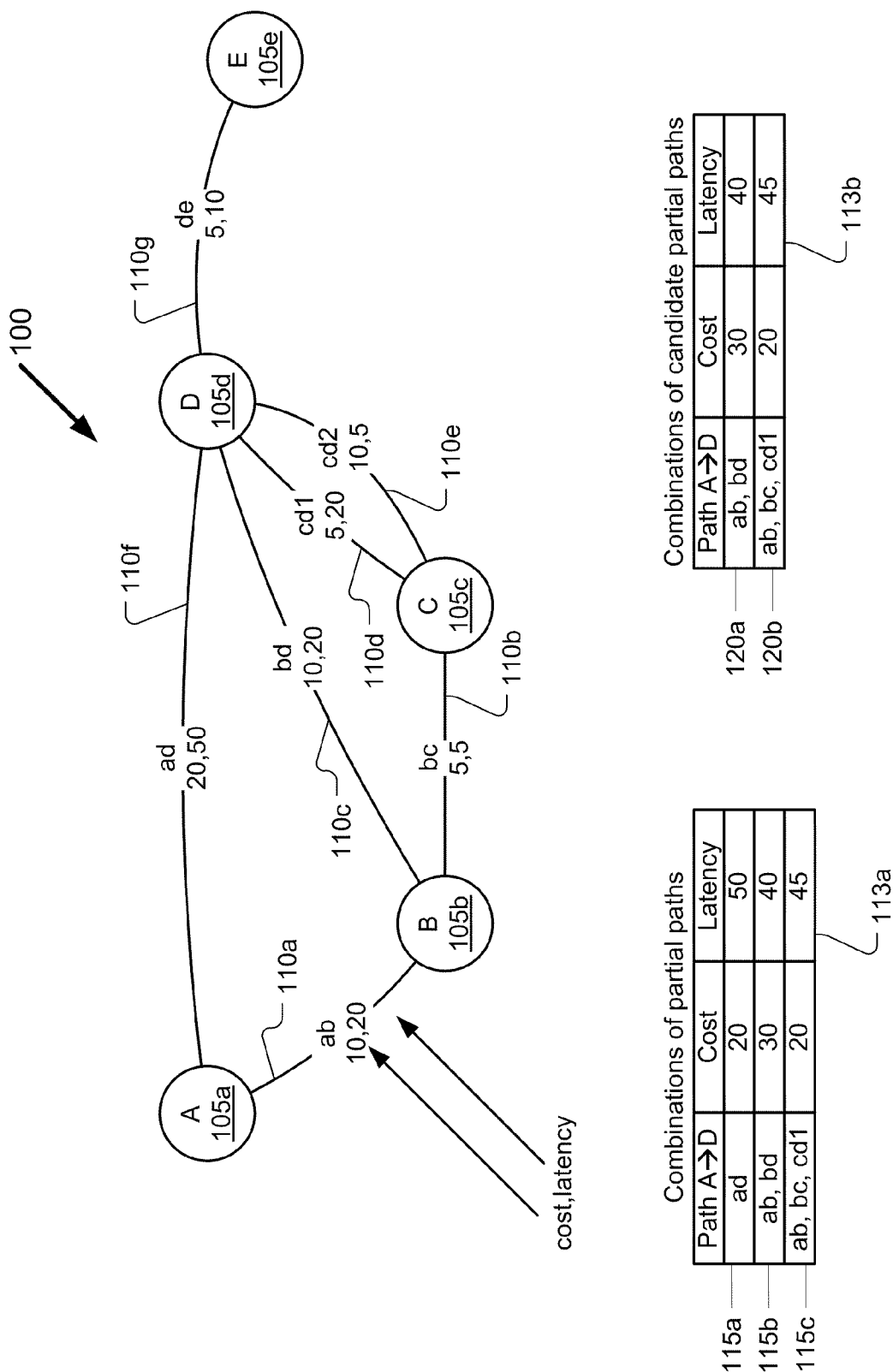
FIG. 1 is a network diagram in which example embodiments of the present invention may be employed.

FIG. 1 illustrates a network 100 of nodes A-E 105a-105e, respectively, and partial paths ab, bc, bd, cd1, cd2, ad, and de, 110a-110g, respectively. The network 100 may be, for example, a mesh network. The partial paths 110a-g may be links, segments, trunks, or the like, and may be physical or logical. The partial paths 110a-g have attributes associated with them. For purposes of describing this and other example embodiments, the attributes illustrated in FIG. 1 are cost (e.g., monetary cost of equipment or use of the equipment that provides service for the partial path) and latency (i.e., an expression of how much time, typically in milliseconds (ms), it takes for a packet of data to go from one designated point to another). Embodiments described herein are not limited to cost and latency, but rather encompass other attributes, such as signal-to-noise ratio and chromatic dispersion. In the network 100, a combination of the partial paths 110a-g forms a path. For example, in FIG. 1, a combination of partial paths ad and de (110f and 110g) form an end-to-end path from node A 105a to node E 105e. A partial path may be between adjacent nodes (e.g., ad) or non-adjacent nodes (e.g. ab and bc). Likewise, a combination of partial paths may include a single partial path or multiple partial paths.

A path searching device (or a procedure performed by the device) which may be in a supervisory node (not shown) or processor employed in any network node having access to data that can be used to determine a path solution, searches for a path solution in the network 100. For example, the path searching device may search for an end-to-end path in the network 100 from node A 105a to node E 105e having the lowest (or least) cost and having a maximum latency of 50 ms.

One embodiment of the invention identifies combinations of partial paths that satisfy an end-to-end path constraint. In one instance in which attributes of the combinations of partial paths include latency, a convenient embodiment identifies the combinations of partial paths for which respective accumulated latencies satisfy an end-to-end path constraint of latency. Along each path between adjacent nodes in FIG. 1 are two metrics, cost and latency. For example, partial path ab has a cost and latency of 10 and 20. In other embodiments, more metrics may be associated with partial paths between adjacent nodes or partial paths spanning between non-adjacent nodes, thereby accounting for factors related to traversing intermediary nodes as well as partial paths. In searching for a path solution having a maximum latency of 50 ms, the embodiment may identify two combinations of partial paths:

a first combination of the partial paths ab, bd, and de (110*a*, 110*c*, and 110*g*, respectively) and a second combination of the partial paths ab, bc, cd2, and de (110*a*, 110*b*, 110*e*, and 110*g*, respectively). Both of the identified combinations have a latency accumulated over the partial paths that meet (i.e., does not exceed) the maximum latency of 50 ms (viz., the combinations have latencies of 50 ms and 40 ms, respectively).

In another instance in which attributes of the combinations of partial paths include signal-to-noise ratio, chromatic dispersion, or similar attribute, a convenient embodiment identifies the combinations of partial paths for which selected attribute(s) satisfy an end-to-end path constraint.

To simplify a selection of a combination of partial paths, a reduction of partial paths eligible to be selected may be performed in advance. The reduction referred is interchangeably referred to herein "pruning," and is performed by comparing attributes of different combinations of partial paths against each other. Combinations of partial paths surviving the pruning are then referred to as candidate combinations of partial paths. Thus, an embodiment may compare attributes of the combinations of partial paths and prune the combinations of partial paths based on results of the comparing to identify candidate combinations of partial paths.

The embodiment may compare attributes of the combinations of partial paths and prune the combinations of partial paths based on results of the comparing to identify candidate combinations of partial paths.

A convenient embodiment keeps (i.e., considers a viable solution) a combination of partial paths for which at least one accumulated attribute of the combination of partial paths compares favorably to a corresponding attribute of another combination of partial paths. The combinations of partial paths that are kept being the candidate combinations of partial paths from which a path solution may be selected. For example, a path searching device (not shown) may search for an end-to-end path in the network 100 from node A 105*a* to node D 105*d* having the lowest (or least) cost and having a maximum latency of 50 ms. In FIG. 1, a table of combinations of partial paths 113*a* and candidate combinations of partial paths 113*b* may be maintained for real-time or non-real-time use. The use of the tables 113*a* and 113*b* are simplistic in this example in adding the metrics corresponding to the attributes of the combinations of partial paths.

The follow illustrates: the path to be selected to carry traffic from node A 105*a* to node D 105*d* may be a first combination 115*a* of the partial path ad (110*f*), a second combination 115*b* of the partial paths ab and bd (110*a* and 110*c*, respectively) or a third combination 115*c* of the partial paths ab and bc, and cd1 (110*a*, 110*d*, and 110*d*, respectively). The first combination 115*a*, second combination 115*b*, and third combination 115*c* have a respective cost of 20, 30, and 20 that is accumulated over their respective partial paths. The first combination 115*a*, second combination 115*b*, and third combination 115*c* have a respective latency of 50 ms, 40 ms, and 45 ms that is accumulated over their respective partial paths.

In this example, the latency of the second combination 115*b* compares favorably to or is otherwise less than the latency of the first combination 115*a* and third combination 115*c* (viz., a latency of 40 ms is less than a latency of 45 ms and a latency of 50 ms). Thus, the embodiment keeps the second combination 115*b* of the partial paths ab and bd (110*a* and 110*c*, respectively) as a candidate combination of partial paths.

The cost of the third combination 115*c* compares favorably to or is otherwise less than the cost of the first combination 115*a* and second combination 115*b* (viz., a cost of 20 is less than a cost of 30). Thus, the embodiment keeps the third combination 115*c* of the partial paths ab, bc, and cd1 (110*a*, 110*d*, and 110*d*, respectively) as a candidate combination of partial paths.

The cost of the first combination 115*a*, however, does not compare favorably to the cost of the second combination 115*b* or third combination 115*c* (viz., a cost of 20 is equal to a cost of 20). Additionally, the latency of the first combination 115*a* is greater than the second combination 115*b* and third combination 115*c* (viz., a latency of 50 ms is greater than a latency of 40 ms and a latency of 45 ms). Thus, the embodiment does not keep, i.e., discards, the first combination 115*a* of the partial path ad (110*f*). In this example, the second combination 115*b* and third combination 115*c* are candidate combinations of partial paths and the first combination 115*a* is not.

It should be understood that a combination of partial paths may automatically be disqualified from being a candidate combination of partial paths if an attribute, such as latency, exceeds a threshold. For example if the threshold were 50 ms and a combination of partial paths has a latency of 100 ms, the combination of partial paths would automatically be disqualified, and, therefore, would not even be a candidate combination of partial paths compared to another combination of partial paths during pruning.

The embodiment selects a candidate combination of partial paths as the path solution. A convenient embodiment selects a candidate combination of partial paths having a cost that is less than the costs of other candidate combinations of partial paths. The selected path solution may be a path of least cost that satisfies the end-to-end path constraint.

Continuing with the previous example, in FIG. 1, the path from node A 105*a* to node D 105*d* may be a first candidate combination 120*a* of partial paths ab and bd (110*a* and 110*c*, respectively) or a second candidate combination 120*b* of partial paths ab and bc, and cd1 (110*a*, 110*b*, and 110*d*, respectively). The cost of the second candidate combination of partial paths 120*b* is less than the cost of the first candidate combination of partial paths 120*a* (viz., the cost of 20 is less than the cost of 30).

In this example, the selected candidate combination of partial paths is a path of least cost that satisfies the end-to-end path constraint of not exceeding a maximum latency of 50 ms. Another convenient embodiment selects a candidate combination of partial paths for which an end-to-end path attribute is optimum.

Some of the foregoing embodiments may be implemented as detailed below in reference to FIGS. 2A-N (and in further reference to FIG. 1).

Selecting a path solution may include having to make trade-offs based on many path attributes. For simple, if considering path constraints (e.g., latency), as a path selection parameter it is insufficient to keep track of only the lowest cost path to a given node. It is possible to discover a higher cost path, but with a lower latency. If the lower cost path does not lead to a solution that can meet the latency constraint, the higher cost path may need to be considered. To handle this possibility, one implementation described below in reference to FIGS. 2A-N keeps track of multiple paths to the same node with an example candidate path container.

Further, in the implementation described below in reference to FIGS. 2A-N, it is not necessary to keep track of every combination of partial paths (or path) found to a given node. It is possible to eliminate one of two paths to the same destination node if one of the paths does not have a lower value for one of the path metrics (or attributes) compared to the other path. In other words, given path A and path B, if every metric (e.g., cost, latency, etc.) for path B is greater than or equal to the corresponding metric in path A, then path B can be discarded.

FIGS. 2A-N illustrate a possible implementation for searching for a path solution in a network. The path solution being searched for (e.g., in response to a routing request) is a path from node A (105*a* of FIG. 1) to node E (105*e* of FIG. 1) that is the lowest cost and meets a maximum latency of 50 ms.

A procedure may be initialized by creating an empty combination of partial paths or simply "an empty path" from node A (105*a* of FIG. 1) to node A (105*a* of FIG. 1) and placing the empty path in a unexpanded paths container. The unexpanded paths container may include paths to be expanded or to be further expanded and processed.

A candidate paths container may include paths discovered through processing (i.e., previously expanded, compared, and pruned) that are of interest. These paths are of interest because each represents, so far, the best path to a node in terms of one or more constraints being considered. As a path from the unexpanded paths container is expanded by following a path or partial path to a node (such a path may be referred to as a potential candidate path or an expanded path), it is compared against a path or paths from the candidate paths container (such a path may be referred to as a candidate path or a previous candidate path). As illustrated in the following figures, based on the results of the comparison, a path may be pruned from either the candidate paths container (i.e., the path is no longer of interest and no longer used to compare other paths to) or from the unexpanded paths container (i.e., there is no need to expend or further expand the path), or a path may not be pruned at all. In each case, however, pruning leads to identifying candidate paths.

Each of the aforementioned containers may be representative of an array, list, linked list, double linked list or other computer data structure.

Referring to FIG. 2A, to begin processing, a path is selected from the unexpanded paths container.

In one instance, the selected path is the first path of the unexpanded paths container or is at the front of the unexpanded paths container. In another instance, entries of the unexpanded paths container are ordered by cost and the selected path is the lowest cost entry in the unexpanded paths container.

In FIG. 2A, the selected path is identified (and referred to) as path 1. Path 1 is not a path to the destination node E (105*e* of FIG. 1), so path 1 is expanded by following partial paths ab and ad (110*a* and 110*f* of FIG. 1) out of node A (105*a* of FIG. 1) to node B (105*b* of FIG. 1) and node D (105*d* of FIG. 1), respectively. Path 1 is processed by expanding partial path ad (110*f* of FIG. 1) to node D (105*d* of FIG. 1) resulting in potential candidate path 2. In this implementation, expanding a path also includes adding or otherwise accumulating cost and latency attributes of partial paths that form the path.

Referring to FIG. 2B, potential candidate path 2 is a valid path. Potential candidate path 2 meets all partial path and end-to-end path constraints. There is no other path in the candidate paths container that compares favorably than potential candidate path 2. In other words, so far, there is no other path better than potential candidate path 2.

Potential candidate path 2 is included in the candidate paths container as candidate path 2 and in the unexpanded paths container to be further expended (illustrated in the next figure). As shown later, candidate path 2 is used in comparing other paths and may be pruned from the candidate paths container.

Referring to FIG. 2C, path 1 is further processed by expanding partial path ab (110*a* of FIG. 1) to node B (105*b* of FIG. 1) to create potential candidate path 3.

Referring to FIG. 2D, the potential candidate path 3 is a valid candidate path Potential candidate path 3 meets all partial path and end-to-end path constraints. Potential candidate path 3 is included in the candidate paths container as candidate path 3 and in the unexpanded paths container to be further expended (illustrated in the next figure). As shown later, path 3 is further expended by following a partial path to a next node.

Referring to FIG. 2E, path 1 is done being processed, so another path is selected from the unexpanded paths container for processing. Path 3 is selected from the unexpanded paths container for further processing.

Path 3 is processed by expanding partial path bc (110*b* of FIG. 1) to node C (110*5c* of FIG. 1) resulting in potential candidate path 4 (illustrated in the next figure).

Referring to FIG. 2F, potential candidate path 4 is a valid candidate. Potential candidate path 4 meets all partial path and end-to-end path constraints. The potential candidate path 4 is included in the candidate paths container as candidate path 4 and in the unexpanded paths container to be further expended (illustrated in the next figure).

Path 3 is further processed by expanding partial path bd (110*c* of FIG. 1) to node D (105*d* of FIG. 1) resulting in potential candidate path 5 (illustrated in the next figure).

Referring to FIG. 2G, potential candidate path 5 is one path to node D (105*d* of FIG. 1)

From the entries included in the candidate paths container, candidate path 2 is also a path to node D (105*d* of FIG. 1). Potential candidate path 5 is compared against candidate path 2.

Candidate path 2 has a lower cost than potential candidate path 5, but has a higher latency than potential candidate path 5. Potential candidate path 5 has a higher cost than candidate path 2, but has a lower latency than candidate path 2. Both candidate path 2 and potential candidate path 5 each have at least one attribute that compares favorably to a corresponding attribute of the other (viz., the cost of candidate path 2 is lower than the cost of potential candidate path 5 and the latency of potential candidate path 5 is lower than the latency of candidate path 2). In other words, no one path is better than the other. As a result, both candidate path 2 and potential candidate path 5 are kept. Potential candidate path 5 is included in the candidate paths container as candidate path 5 and the unexpanded paths container to be further expended (illustrated in the next figure). In this example, pruning keeps path 5 as a candidate path along with path 2 in the candidate paths container.

However, if path 5 has no attribute that compares favorably to a corresponding attribute of path 2, then pruning removes path 5 from the unexpanded paths container. In this case, there is no need to further expand path 5 because it already compares unfavorably to other paths.

Referring to FIG. 2H, path 3 is done being processed, so another path is selected from the unexpanded paths container for processing. Path 4 is selected from the unexpanded paths container for processing. Path 4 is expanded with partial path cd1 (110*d* of FIG. 1) to node D (105*d* of FIG. 1) resulting in potential candidate path 6 (illustrated in the next figure).

Referring to FIG. 2I, potential candidate path 6 is one path to node D (105*d* of FIG. 1). From the entries included in the candidate paths container, candidate paths 2 and 5 are also paths to node D (105*d* of FIG. 1). Potential candidate path 6 is compared against candidate paths 2 and 5.

Candidate path 2 has a cost equal to potential candidate path 6. Candidate path 2 has a higher latency than potential candidate path 6. As such, candidate path 2 does not have at least one attribute that compares favorably to a corresponding attribute of another candidate path. Candidate path 2 is removed from the candidate paths container and unexpanded paths container (illustrated in the next figure). In this instance, pruning removes a candidate path from the candidate paths container and the unexpanded paths container i.e., path 2 is no longer of interest for comparing and pruning purposes, and there no need to further expand the path.

Potential candidate path 6 has a lower cost than candidate path 5, but has a higher latency than candidate path 5. Candidate path 5 has a higher cost than potential candidate path 6, but has a lower latency than potential candidate path 6. Both candidate path 5 and potential candidate path 6 each have at least one attribute that compares favorably to a corresponding attribute of the other (viz., the cost of potential candidate path 6 is lower than the cost of candidate path 5 and the latency of candidate path 5 is lower than the latency of potential candidate path 6). In other words, no one path is better than the other. As a result, both candidate path 5 and potential candidate path 6 are kept. Potential candidate path 6 is included in the candidate paths container as candidate path 6 and the unexpanded paths container (illustrated in the next figure).

Path 4 is still being processed. Path 4 is expanded with partial path cd2 (110e of FIG. 1) to node D (105d of FIG. 1) resulting in potential candidate path 7 (illustrated in the next figure).

Referring to FIG. 2J, potential candidate path 7 is one path to node D (105d of FIG. 1). From the entries included in the candidate paths container, candidate paths 5 and 6 are also paths to node D (105d of FIG. 1). Potential candidate path 7 is compared against candidate paths 5 and 6.

Candidate path 5 has a higher cost than potential candidate paths 7. Candidate path 5 has a higher latency than potential candidate path 7. As such, candidate path 5 does not have at least one attribute that compares favorably to a corresponding attribute of another candidate path. Candidate path 5 is removed from the candidate paths container and the unexpanded paths container.

Candidate path 6 has a lower cost than potential candidate path 7, but has a higher latency than potential candidate path 7. Potential candidate path 7 has a higher cost than candidate path 6, but has a lower latency than candidate path 6. Both candidate path 6 and potential candidate path 7 each have at least one attribute that compares favorably to a corresponding attribute of the other (viz., the cost of candidate path 6 is lower than the cost of potential candidate path 7 and the latency of potential candidate path 7 is lower than the latency of candidate path 6). In other words, no one path is better than the other. As a result, both candidate path 6 and potential candidate path 7 are kept. Potential candidate path 7 is included in the candidate paths container as candidate path 7 and the unexpanded paths container.

Referring to FIG. 2K, path 4 is now done being processed, so another path is selected from the unexpanded paths container for processing. Path 6 is selected from the unexpanded paths container for processing. Path 6 is expanded with partial path de (110g of FIG. 1) to node E (105e of FIG. 1) resulting in potential candidate path 8 (illustrated in the next figure).

Referring to FIG. 2L, potential candidate path 8 fails to meet the latency constraint of 50 ms, so potential candidate path 8 is deleted or otherwise not included in the candidate paths container and the unexpanded paths container (illustrated in the next figure). In this instance, there is no need for comparing and pruning paths to identify path 8 as a candidate path because it exceeds the end-to-end constraint and cannot be a candidate path.

Path 6 is now done being processed, so another path is selected from the unexpanded paths container for processing. Path 7 is selected from the unexpanded paths container and processed by expanding partial path de (110g of FIG. 1) to node E (105e of FIG. 1) resulting in potential candidate path 9 (illustrated in the next figure).

Referring to FIG. 2M, there is no better path to node E (105e of FIG. 1), so potential candidate path 9 is included in the candidate paths container as candidate path 9 and the unexpanded paths container.

The processing of path 7 is complete, so another path is selected from the unexpanded paths container for processing. Path 9 is selected from the unexpanded paths container for processing.

Referring to FIG. 2N, because path 9 is a path to the destination, the lowest cost path that meets the maximum of latency of 50 ms is found.

Path 9 is returned (e.g., in a response to a request to search for a path solution in a network).

Figure 3:
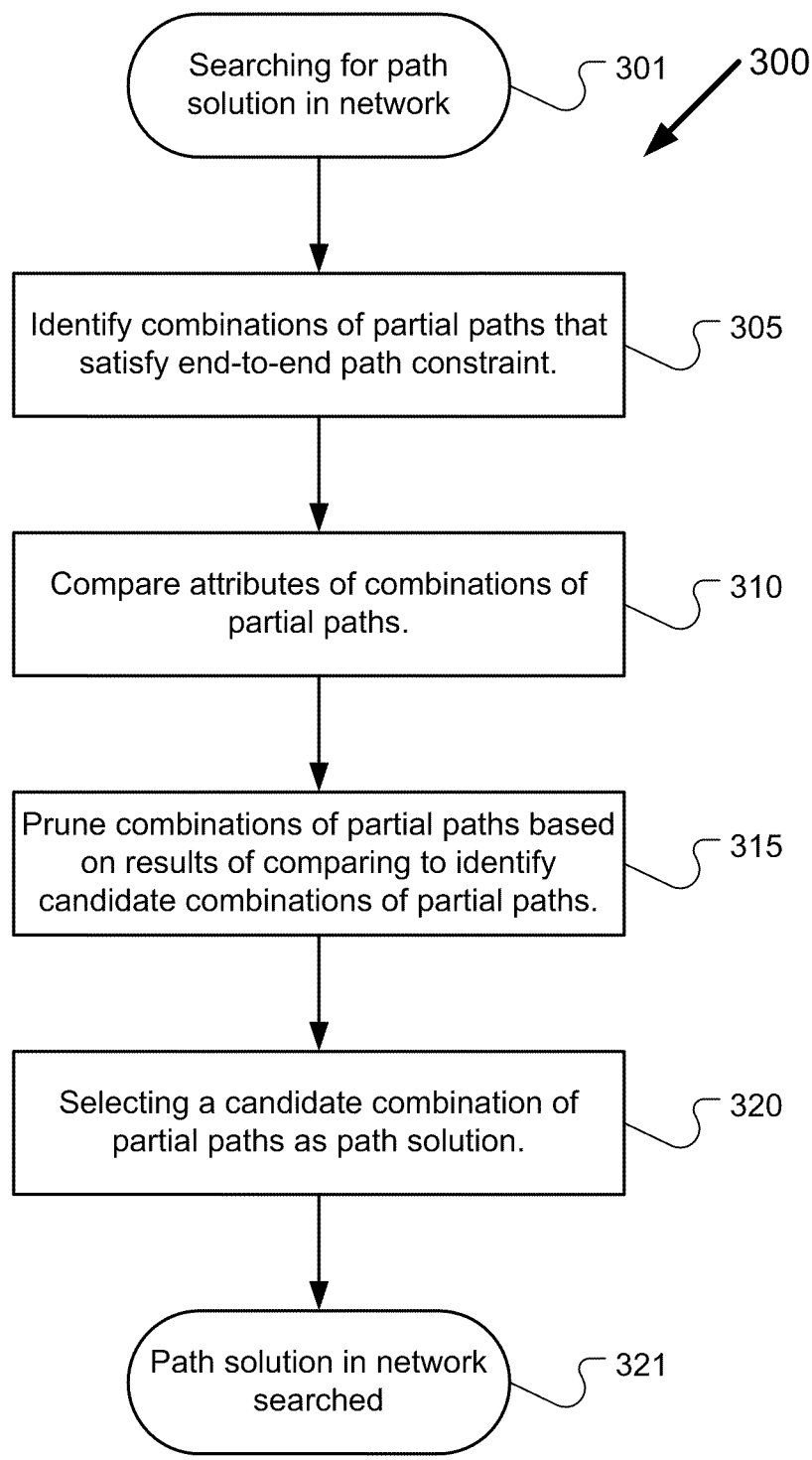
FIG. 3 is a flowchart of an example procedure for searching for a path solution in a network.

FIG. 3 illustrates an example process 300 for searching for a path solution in a network. The process 300 starts (301). The process 300 identifies (305) combinations of partial paths that satisfy an end-to-end path constraint. The process 300 compares (310) attributes of the combinations of partial paths. The process 300 prunes (315) the combinations of partial paths based on results of the comparing to identify candidate combinations of partial paths.

In a convenient embodiment (not shown), pruning combinations of partial paths includes keeping a combination of partial paths for which at least one accumulated attribute of a combination of partial paths compares favorably to a corresponding attribute of another combination of partial paths. Combinations of partial paths that are kept being the candidate combinations of partial paths from which a path solution may be selected.

In another embodiment (not shown), pruning combinations of partial paths includes discarding a combination of partial paths for which accumulated attributes of the combination of partial paths compares unfavorably to corresponding accumulated attributes of another combination of partial paths. For example, referring to FIG. 2J, a pruning process discards candidate path 5 because it has both a higher cost and higher latency than potential candidate paths 7.

Continuing with FIG. 3, the process 300 selects (320) a candidate combination of partial paths as the path solution. The process 300 ends (321) with the path solution in the network searched.

The foregoing example process 300 may be executed or otherwise performed by a path searching device. Alternatively, the process 300 may be executed by a control plane in a configuration entity, such as an element management system (EMS) or a network management system (NMS) for configuring and managing the network.

Figure 4:
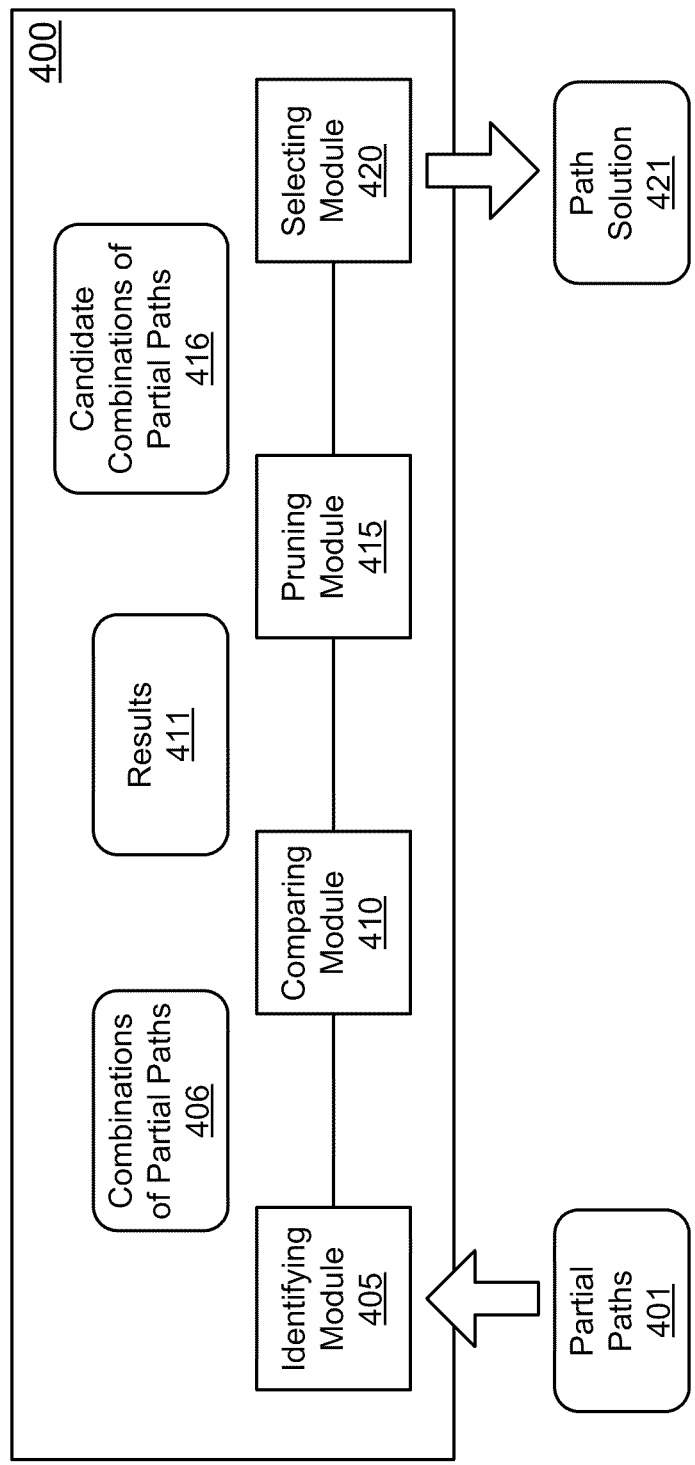
FIG. 4 is a block diagram of an example device to search for a path solution in a network.

FIG. 4 illustrates an example path searching device or apparatus 400 to search for a path solution in a network. The apparatus 400 includes an identifying module 405, comparing module 410, pruning module 415, and selecting module 420, each communicatively coupled to one another.

From partial paths 401 or representations thereof, the identifying module 405 identifies combinations of partial paths 406 that satisfy an end-to-end path constraint. The searching device 400 may be configured with a source and destination of the end-to-end path, the end-to-end path constraint, and other parameters (not shown) by a configuration entity, such as a human operator or element/network management system. Alternatively, the searching device 400 may have access to a configuration (e.g., retrieving a configuration file from another device) that includes the foregoing parameters.

In a convenient embodiment (not shown), an identifying module (e.g., the identifying module 405) is configured to identify the combinations of partial paths for which respective accumulated latencies satisfy an end-to-end path constraint of latency.

In another convenient embodiment (not shown), an identifying module (e.g., the identifying module 405) is configured to identify the combinations of partial paths for which respective accumulated signal-to-noise ratios satisfy an end-to-end path constraint of signal-to-noise ratio.

Continuing to FIG. 4, from the identified combinations of partial paths 406, the comparing module 410 compares attributes of the combinations of partial paths to produce results 411 of the comparing.

Based on the results 411, the pruning module 415 prunes the combinations of partial paths to identify candidate combinations of partial paths 416.

In a convenient embodiment (not shown), a pruning module (e.g., the pruning module 415 of FIG. 4) includes a keeping sub-module or is otherwise further configured to keep a combination of partial paths for which at least one accumulated attribute of a combination of partial paths compares favorably to a corresponding attribute of another combination of partial paths, the combinations of partial paths that are kept are candidate combinations of partial paths (e.g., the candidate combinations of partial paths 416 of FIG. 4). The kept combinations of partial paths are candidate combinations of partial paths from which the selecting module may select a path solution.

A pruning module may be further configured to discard a combination of partial paths for which accumulated attributes of the combination of partial paths compares unfavorably to corresponding accumulated attributes of another combination of partial paths. For example, referring to FIG. 2J, the pruning module discards candidate path 5 because it has both a higher cost and higher latency than potential candidate paths 7.

Continuing with FIG. 4, from the identified candidate combinations of partial paths 416, the selecting module 420 selects a candidate combination of partial paths as the path solution 421.

In a convenient embodiment (not shown), a selecting module (e.g., the selecting module 420 is configured to select the candidate combination of partial paths for which an end-to-end path attribute is optimum.

Alternatively, the path searching device 400 may be a general purpose computer having a processor, memory, communication interface, etc (described in greater detail below in reference to FIG. 5B). The general purpose computer is transformed into the path searching device 400 and its components, for example, by loading instructions into the processor that cause the computer to identify combinations of partial paths that satisfy an end-to-end path constraint, to compare attributes of the combinations of partial paths, to prune the combinations of partial paths based on results of the comparing to identify candidate combinations of partial paths, and to select a candidate combination of partial paths as the path solution.

Figure 5A:
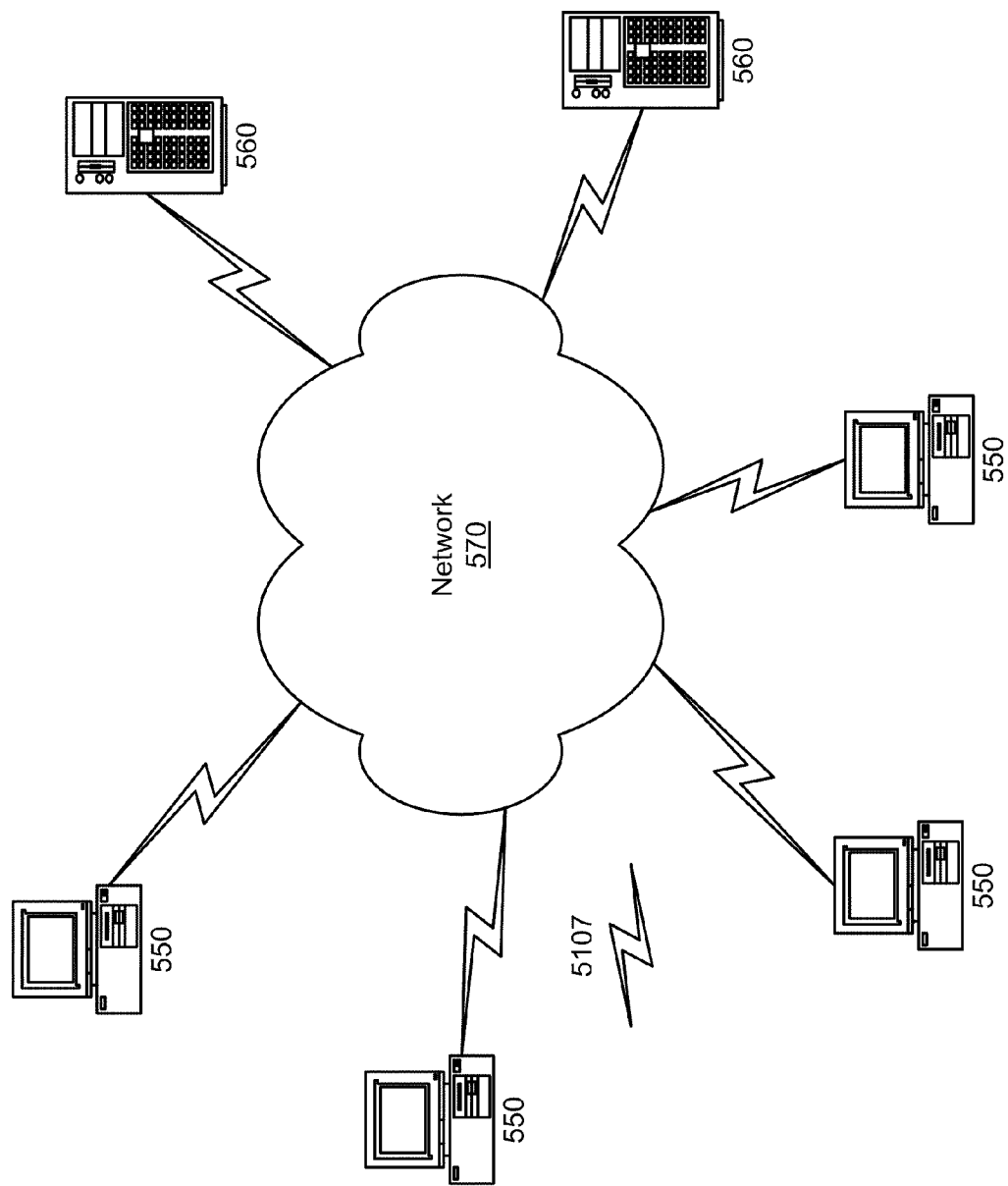
FIG. 5A is an example network employing embodiments of the present invention.

FIG. 5A illustrates a computer network or similar digital processing environment in which embodiments of the present invention may be deployed. Client computer(s)/devices 550 and server computer(s) 560 provide processing, storage, and input/output devices executing application programs and the like. Client computer(s)/devices 550 can also be linked through communications network 570 to other computing devices, including other client devices/processes 550 and server computer(s) 560. Communications network 570 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5B:
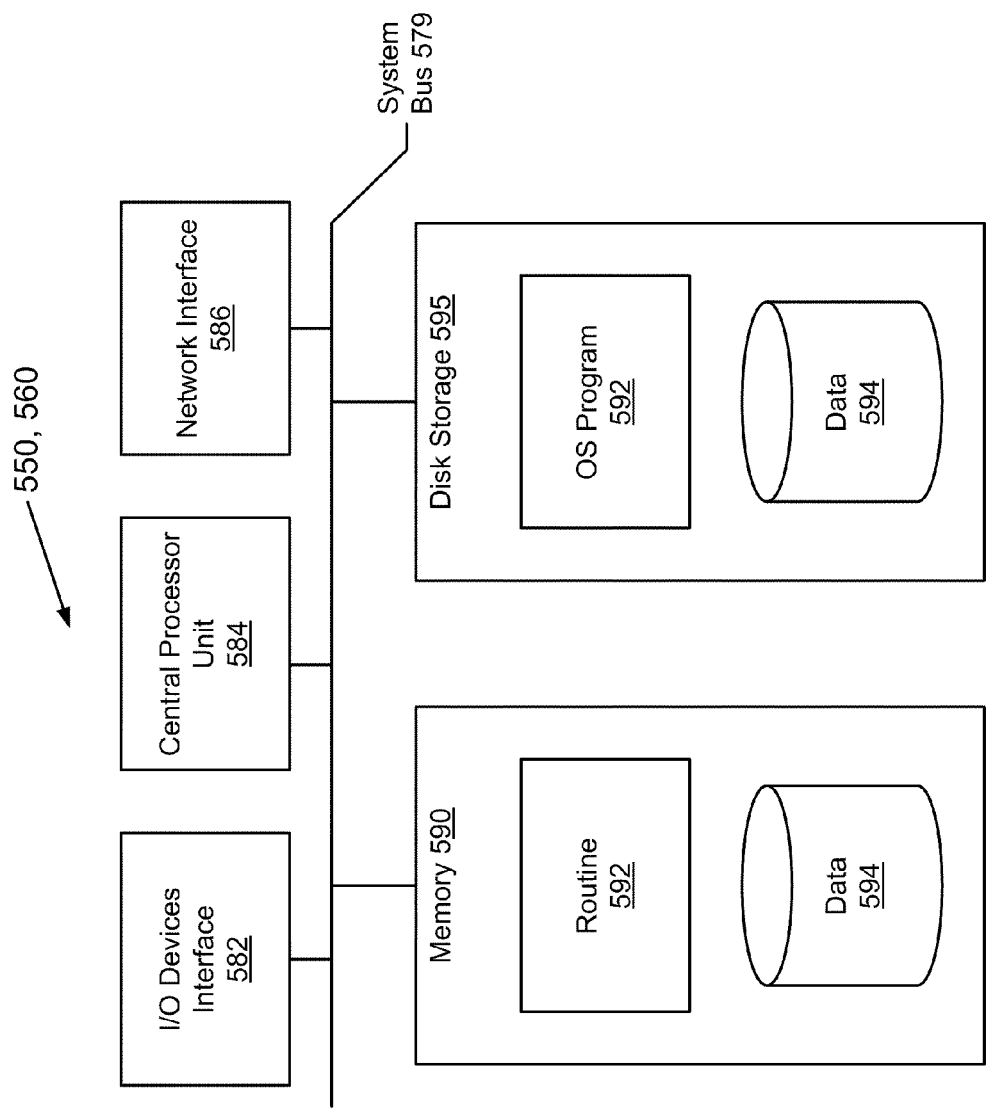
FIG. 5B is an example computer implementing embodiments of the present invention.

FIG. 5B is a block diagram of the internal structure of a computer (e.g., client processor/device 550 or server computers 560 of FIG. 5A) in which various embodiments of the present invention may be implemented. Each computer 550, 560 contains system bus 579, where a bus is a set of hardware lines used for data transfer among the components of a computer or processing system. Bus 579 is essentially a shared conduit that connects different elements of a computer system (e.g., processor, disk storage, memory, input/output ports, network ports, etc.) that enables the transfer of information between the elements. Attached to system bus 579 is I/O device interface 582 for connecting various input and output devices (e.g., keyboard, mouse, displays, printers, speakers, etc.) to the computer 550, 560. Network interface 586 allows the computer to connect to various other devices attached to a network (e.g., network 570 of FIG. 5A). Memory 590 provides volatile storage for computer software instructions 592 and data 594 used to implement an embodiment of the present invention. Disk storage 595 provides non-volatile storage for computer software instructions 592 and data 594 used to implement an embodiment of the present invention. Central processor unit 584 is also attached to system bus 579 and provides for the execution of computer instructions.

In one embodiment, the processor routines 592 and data 594 are a computer program product (generally referenced 592), including a computer readable medium (e.g., a removable storage medium such as one or more DVD-ROM's, CD-ROM's, diskettes, tapes, etc.) that provides at least a portion of the software instructions for the invention system. Computer program product 592 can be installed by any suitable software installation procedure, as is well known in the art.

Further, the present invention may be implemented in a variety of computer architectures. The computer of FIGS. 5A and 5B are for purposes of illustration and not limitation of the present invention.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for searching for a path solution in a network, the method performed by a path searching device, the method comprising:
   identifying, by the path searching device, combinations of partial paths in the network that satisfy an end-to-end path constraint;
   comparing, by the path searching device, attributes of the combinations of partial paths against each other;
   pruning, by the path searching device, the combinations of partial paths based on results of the comparing to identify candidate combinations of partial paths, the pruning including keeping a combination of partial paths for which at least one accumulated attribute of the combination of partial paths compares favorably to a corresponding accumulated attribute of another combination of partial paths, the combinations of partial paths that are kept being candidate combinations of partial paths from which a path solution may be selected; and
   selecting, by the path searching device, a candidate combination from the candidate combinations of partial paths identified as the path solution.

2. The method of claim 1 wherein identifying, by the path searching device, the combinations of partial paths that satisfy the end-to-end constraint includes expanding a path with a partial path to a node to form an expanded path, the end-to-end constraint being satisfied if attributes of each partial path forming the expanded path, added together, are less than the constraint;
   wherein comparing, by the path searching device, the attributes of the combinations of partial paths includes comparing the attributes of the expanded path against attributes of a previously identified candidate combination of partial paths to the node called a previous candidate path, the previous candidate path being stored in a candidate paths container;
   wherein pruning, by the path searching device, the combinations of partial paths further includes:
      removing the expanded path if the expanded path has no attribute that compares favorably to a corresponding attribute of the previous candidate path;
      removing the previous candidate path from the candidate paths container if the previous candidate path has no attribute that compares favorably to a corresponding attribute of the expanded path;
      keeping both the expanded path and the previous candidate path in the candidate paths container if each has an attribute that compares favorably to a corresponding attribute of the other; and
   wherein selecting, by the path searching device, the candidate combination of partial paths as the path solution includes selecting a candidate path from the candidate paths container as the path solution.

3. The method of claim 1 wherein identifying, by the path searching device, the combinations of partial paths includes disqualifying a combination of partial paths that exceeds an end-to-end path constraint from being compared against other combinations of partial paths.

4. The method of claim 1 wherein identifying, by the path searching device, the combinations of partial paths includes identifying the combinations of partial paths for which respective accumulated latencies satisfy an end-to-end path constraint of latency.

5. The method of claim 1 wherein identifying, by the path searching device, the combinations of partial paths includes identifying the combinations of partial paths for which respective accumulated signal-to-noise ratios satisfy an end-to-end path constraint.

6. The method of claim 1 wherein identifying, by the path searching device, the combinations of partial paths includes identifying the combinations of partial paths for which respective accumulated chromatic dispersions satisfy an end-to-end path constraint.

7. The method of claim 1 wherein pruning, by the path searching device, the combinations of partial paths further includes discarding a combination of partial paths for which accumulated attributes of the combination of partial paths compares unfavorably to corresponding accumulated attributes of another combination of partial paths.

8. The method of claim 1 wherein selecting, by the path searching device, the candidate combination of partial paths as the path solution includes selecting a candidate combination of partial paths having a cost that is less than costs of other candidate combinations of partial paths, the path solution being a path of least cost and satisfying the end-to-end path constraint.

9. The method of claim 1 wherein selecting, by the path searching device, the candidate combination of partial paths as the path solution includes selecting the candidate combination of partial paths for which an end-to-end path attribute is optimum.

10. The method of claim 1 wherein identifying the combinations of partial paths that satisfy the end-to-end constraint includes expanding a path with a partial path to a node to form an expanded path, the end-to-end constraint being satisfied if attributes of each partial path forming the expanded path, added together, are less than the constraint.

11. The method of claim 10 wherein comparing the attributes of the combinations of partial paths includes comparing the attributes of the expanded path against attributes of a previously identified candidate combination of partial paths to the node, the previously identified candidate combination of partial paths to the node being stored in a candidate paths container, and further wherein selecting the candidate combination of partial paths as the path solution includes selecting a candidate path from the candidate paths container as the path solution.

12. The method of claim 11 wherein pruning the combination of partial paths further includes:
   removing the expanded path if the expanded path has no attribute that compares favorably to a corresponding attribute of the previous candidate path;
   removing the previous candidate path from the candidate paths container if the previous candidate path has no attribute that compares favorably to a corresponding attribute of the expanded path; and
   keeping both the expanded path and the previous candidate path in the candidate paths container if each has an attribute that compares favorably to a corresponding attribute of the other.

13. The method of claim 1 wherein identifying, by the path searching device, the combinations of partial paths that satisfy the end-to-end constraint includes expanding a path with a partial path to a node to form an expanded path, and further wherein comparing the attributes of the combinations of partial paths includes comparing the attributes of the expanded path against attributes of a previously identified candidate combination of partial paths to the node, the previously identified candidate combination of partial paths to the node being stored in a candidate paths container.

14. An apparatus to search for a path solution in a network, the apparatus comprising:
    an identifying module to identify combinations of partial paths that satisfy an end-to-end path constraint;
    a comparing module, communicatively coupled to the identifying module, to compare attributes of the combinations of partial paths against each other;
    a pruning module, communicatively coupled to the comparing module, to prune the combinations of partial paths based on results of the comparing to identify candidate combinations of partial paths, the pruning module configured to keep a combination of partial paths for which at least one accumulated attribute of the combination of partial paths compares favorably to a corresponding accumulated attribute of another combination of partial paths, the combinations of partial paths that are kept being candidate combinations of partial paths from which the selecting module may select a path solution;
    a selecting module, communicatively coupled to the pruning module, to select a candidate combination from the candidate combinations of partial paths identified as the path solution.

15. The apparatus of claim 14 wherein the identifying module is configured to disqualifying a combination of partial paths that exceeds an end-to-end path constraint from being compared to other combinations of partial paths.

16. The apparatus of claim 14 wherein the identifying module is configured to identify the combinations of partial paths for which respective accumulated latencies satisfy an end-to-end path constraint.

17. The apparatus of claim 14 wherein the identifying module is configured to identify the combinations of partial paths for which respective accumulated signal-to-noise ratios satisfy an end-to-end path constraint.

18. The apparatus of claim 14 wherein the identifying module is configured to identify the combinations of partial paths for which respective accumulated chromatic dispersions satisfy an end-to-end path constraint.

19. The apparatus of claim 14 wherein the pruning module is further configured to discard a combination of partial paths for which accumulated attributes of the combination of partial paths compares unfavorably to corresponding accumulated attributes of another combination of partial paths.

20. The apparatus of claim 14 wherein the selecting module is configured to select a candidate combination of partial paths having a cost that is less than costs of other candidate combinations of partial paths, the path solution being a path of least cost and satisfying the end-to-end path constraint.

21. The apparatus of claim 14 wherein the selecting module is configured to select the candidate combination of partial paths for which an end-to-end path attribute is optimum.

22. A computer program product comprising a non-transitory computer readable medium having stored thereon a computer readable program, the computer readable program when loaded into a computer processor transforms the computer processor into a programmed computer processor and when executed causes the programmed computer processor to:
    identify combinations of partial paths that satisfy an end-to-end path constraint;
    compare attributes of the combinations of partial paths against each other;
    prune the combinations of partial paths, based on results of the comparing to identify candidate combinations of partial paths, including keeping a combination of partial paths for which at least one accumulated attribute of the combination of partial paths compares favorably to a corresponding accumulated attribute of another combination of partial paths, the combinations of partial paths that are kept being candidate combinations of partial paths from which a path solution may be selected; and
    select a candidate combination from the candidate combinations of partial paths identified as the path solution.

23. A method for searching for a path solution in a network, the method performed by a path searching device, the method comprising:
    identifying, by the path searching device, combinations of partial paths in the network that satisfy an end-to-end path constraint;
    comparing, by the path searching device, attributes of the combinations of partial paths against each other;
    pruning, by the path searching device, the combinations of partial paths based on results of the comparing to identify candidate combinations of partial paths; and
    selecting, by the path searching device, a candidate combination from the candidate combinations of partial paths identified as the path solution, wherein:
        the identifying includes expanding a path with a partial path to a node to form an expanded path, the end-to-end constraint being satisfied if attributes of each partial path forming the expanded path, added together, are less than the constraint;
        the comparing includes comparing the attributes of the expanded path against attributes of a previously identified candidate combination of partial paths to the node called a previous candidate path, the previous candidate path being stored in a candidate paths container;
        the pruning includes:
            removing the expanded path if the expanded path has no attribute that compares favorably to a corresponding attribute of the previous candidate path;
            removing the previous candidate path from the candidate paths container if the previous candidate path has no attribute that compares favorably to a corresponding attribute of the expanded path; and
            keeping both the expanded path and the previous candidate path in the candidate paths container if each has an attribute that compares favorably to a corresponding attribute of the other; and
        the selecting includes selecting a candidate path from the candidate paths container as the path solution.

24. A method for searching for a path solution in a network, the method performed by a path searching device, the method comprising:
    identifying, by the path searching device, combinations of partial paths in the network that satisfy an end-to-end path constraint;
    comparing, by the path searching device, attributes of the combinations of partial paths against each other;
    pruning, by the path searching device, the combinations of partial paths based on results of the comparing to identify candidate combinations of partial paths; and
    selecting, by the path searching device, a candidate combination from the candidate combinations of partial paths identified as the path solution, wherein:
        the identifying includes expanding a path with a partial path to a node to form an expanded path, the end-to-end constraint being satisfied if attributes of each partial path forming the expanded path, added together, are less than the constraint;

the comparing includes comparing the attributes of the expanded path against attributes of a previously identified candidate combination of partial paths to the node, the previously identified candidate combination of partial paths to the node being stored in a candidate paths container, and the selecting includes selecting a candidate path from the candidate paths container as the path solution.

25. A method for searching for a path solution in a network, the method performed by a path searching device, the method comprising:

identifying, by the path searching device, combinations of partial paths in the network that satisfy an end-to-end path constraint;

comparing, by the path searching device, attributes of the combinations of partial paths against each other;

pruning, by the path searching device, the combinations of partial paths based on results of the comparing to identify candidate combinations of partial paths; and selecting, by the path searching device, a candidate combination from the candidate combinations of partial paths identified as the path solution wherein:

the identifying includes expanding a path with a partial path to a node to form an expanded path; and the comparing includes comparing the attributes of the expanded path against attributes of a previously identified candidate combination of partial paths to the node, the previously identified candidate combination of partial paths to the node being stored in a candidate paths container.

* * * * *